April 27, 1948. C. L. TOMLINSON 2,440,313
SHUTTERLESS MOTION PICTURE LENS SYSTEM
Filed March 20, 1946 2 Sheets-Sheet 1

INVENTOR.
CLARENCE L. TOMLINSON
BY
Edward L. Johnson
Attorney

April 27, 1948.  C. L. TOMLINSON  2,440,313
SHUTTERLESS MOTION PICTURE LENS SYSTEM
Filed March 20, 1946   2 Sheets-Sheet 2

INVENTOR.
CLARENCE L. TOMLINSON
BY Howard L. Johnson
Attorney

Patented Apr. 27, 1948

2,440,313

UNITED STATES PATENT OFFICE 2,440,313

SHUTTERLESS MOTION-PICTURE LENS SYSTEM

Clarence L. Tomlinson, Los Angeles, Calif., assignor of one-half to Robert J. Brandt, Los Angeles, Calif.

Application March 20, 1946, Serial No. 655,782

19 Claims. (Cl. 88—16.8)

This invention relates to a lens or prism of novel construction and properties, to an optical system using such lens and to the employment of such a system in the motion picture art, in optical printing and the like.

In one of its embodiments, the invention provides a method and apparatus for transmitting an image through a moving lens between a light-sending and a light-receiving object, one of which objects is a moving film, and in such form, the invention may be illustrated by a shutterless motion picture camera or a similar motion picture projector.

In the past, moving picture projection has been accomplished with a combined continuous and intermittent mechanism which moved successive frames of film into projection alignment, momentarily exposed the aligned frame and then closed the projection aperture until another frame had been brought into place. Since the illusion of motion is achieved by persistence of vision between one image and a subsequent similar image, the successive frames have to be moved through the projector at a considerable rate of speed, conventionally at 24 frames per second, or approximately 90 feet per minute. Some particularly undesirable results arising from this method of operation have been flicker and eye strain as well as a very appreciable wear and tear on the film and apparatus due to the necessary intermittent movement carried out at such high speed. In addition, the requirement of strong enough lighting to overcome the phase of blackout when the shutter is necessarily closed, which period may amount to 20% of the operating time, is a handicap found particularly vexing in color photography and television.

In my U. S. patent application Serial No. 639,307, filed January 5, 1946, there was described and claimed an apparatus and method for transmitting motion picture light images, which system eliminates such defects. Now the present application provides an improvement in the apparatus and method there set out, of which this is a continuation-in-part.

In brief, my optical system is based on an arrangement of elements which coordinate the progressive travel of a film across a camera or projector aperture with a graduated variation in refractive power of an aligned transparent member moving transversely thereto, so that a continuous series of consecutive stationary images may be clearly transmitted between the screen or subject on one side of the refractor and the film on the opposite side, without interrupting the passage of light through the system at any time. Thus, the light may be transmitted to or from the film through the refractor. In other words, this arrangement of elements may be employed in a moving picture camera—in which case the light is transmitted onto the raw or light-sensitive film from the subject being photographed—or alternately it may be used in a moving picture projector or an optical printer—in which event the light is transmitted in the opposite direction, that is, from the printed film onto a screen or other recording surface.

Conveniently such refractive element may take the form of a generally annular rotor, bearing adjacent its perimeter a pair of parallel faces through which the light passes, each face preferably being characterized by a radial plane or midpoint of zero refraction and corresponding cycles of progressively increasing refraction extending along said face on either side of said mid-point, opposite in sign, and adapted jointly to accommodate the shift of a frame of film as it moves a distance equal to its height, so that, for example when employing such a rotor in a projector, each consecutive, moving frame of film would be projected onto the screen as a stationary picture during the period in which the rotor moves the length of the refractive path and the aligned film simultaneously moves transversely thereto the distance of one frame. The refractive path on the rotor face adjacent the moving film is spiral while that on the opposite parallel rotor face is annular.

As depicted in my above application, a film is drawn past a two-frame aperture axially to the rotating refractor, the light being transmitted to or from the film successively through the inner and outer peripheral faces of the aligned rotor in a generally radial direction. Since the inclination of the spiral path by itself produces the effect of one prism and the curvature of this path about the outer circumference of the rotor amounts to a second or superimposed prism in the beam of light, it is necessary to compensate for this double prism effect by an additional plano-concave cylindrical lens interposed in the shaft of light on the inner side of the rotor. As shown in my prior application, this corrective lens is transparent only in an area equal to one frame of film corresponding to the height of the refractive path of the adjacent annular path.

It is now an object of the present invention to provide such an optical system which does not require the above mentioned corrective lens.

A further purpose is the provision of means and method for effectively operating the rotating refractor at a slower speed in relation to the movement of said film than heretofore obtained.

Another important object is the production of such an optical system, particularly useful in a motion picture camera, whereby elimination of possible fuzziness or indistinctness of the projected image is effected by preventing the passage of light through the rotor on either side of the refractive path.

A still further purpose is to provide a novel rotary lens which may be used interchangeably in various apparatus employing the present optical system and which may be more readily operated on a spindle, or the like, due to the fact that the light refracted by the lens does not enter or travel toward the center or hub portion of the rotor.

Additional objects and advantages will become apparent from the following description and claims, the invention consisting in the features of construction, combination of parts, the unique relations of the members and the relative proportioning, disposition and operation thereof, all as more completely outlined herein, illustrated in the drawings and more particularly enumerated in the appended claims.

Referring to the drawings which form part of the present specification, and which for ease of understanding have been designed to show schematically only the essential operating elements of my improved lens system:

Figure 1:
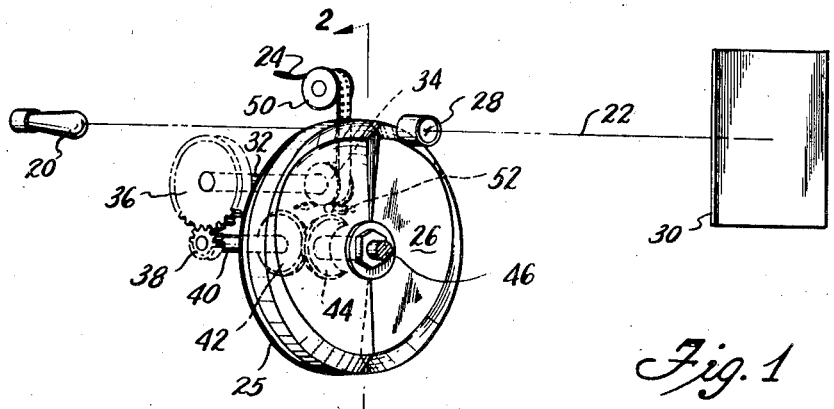
Figure 1 is a perspective view of a moving picture device embodying my invention.

The improved operation obtained by my present construction is based in part upon employment of a refractive rotor of the type described wherein the pair of progressively inclined parallel surfaces are disposed about the end or axial faces 16 and 17 of the rotor rather than around the inner and outer peripheral faces 18 and 19 as was shown in my previous application. With this construction the axis or spindle upon which the rotor is mounted may extend as far as desired in either direction without danger of interfering with the refracted beam of light. In addition, such arrangement eliminates the cylindrical curvature in the refractive path producing the cylindrical aberration or dual prism effect of the rotor referred to above.

Another feature of improvement resides in providing an opaque surface or disk on one face of said rotor, preferably the face adjacent the moving film so as to block off all extraneous light except that which passes through the refractive path to or from a single frame of film. This prevents light filtering through the rotor on either side of the spiral path and results in the production of a more distinct and clear image, especially valuable when such rotor is employed in a camera.

In addition, a plurality of consecutive spiral paths are provided on a single rotor so that the speed of the rotor in relation to the passage of the film may be commensurately reduced, thus eliminating appreciable engineering problems associated with high speed operation.

For ease of explanation, my improved lens system will again be illustrated by reference to its use in a moving picture projector. As seen particularly in Figures 1 and 2, a ray of light moving from a source of illumination 20 along a path 22, is caused to pass successively through a moving film 24, a scanning disk 25, through a pair of axially spaced parallel inclined faces of a refractive rotor 26, then through a suitable objective lens 28 onto a screen 30. Synchronous movement of the film with the aligned scanning disk and rotor are effective by a drive shaft 32 connected to a suitable source of rotative power not shown. Mounted upon the drive shaft is a pull-down sprocket 34 having the usual teeth adapted to engage sprocket holes in the moving picture film 24, and a spur gear 36, axially spaced therefrom and disposed to engage a smaller gear 38 provided upon an auxiliary shaft 40. The motion of this smaller spur gear 38 is in turn transmitted to the rotor 26 by means of a pair of miter gears 42 and 44 secured respectively to said auxiliary shaft 40 and rotor shaft 46. The scanning disk 25 is secured to the hub 48 of the rotor by suitable adhesive or cement, the projector assembly being completed by an idler sprocket 50 and roller 52 disposed on opposite sides of the pull-down sprocket 34, the roller 52 serving to hold the film against the periphery of the sprocket 34.

Figure 4:
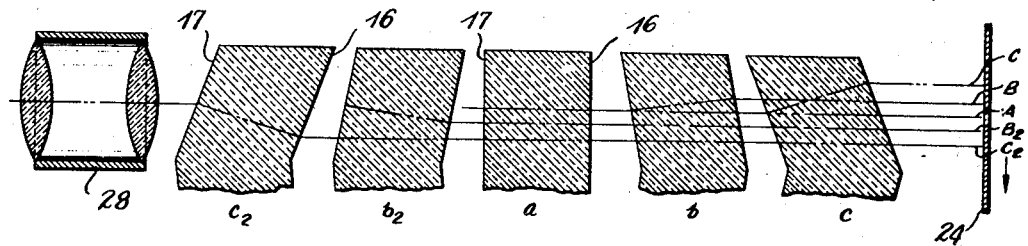
Figure 4 is an exploded diagrammatic axial sectional view of a rotor showing the path taken by a ray of light refracted by it at successive stations of rotation.
Figure 5:
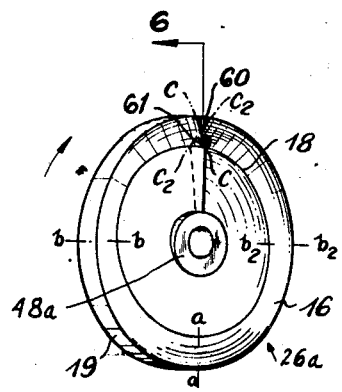
Figure 5 is a perspective view of a single phase rotor with the rotational stations of the sections of Figure 4 indicated thereon.
Figure 7:
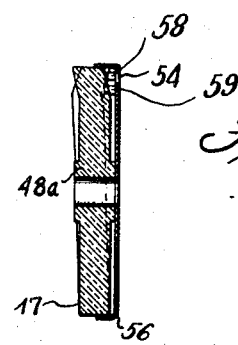
Figure 7 is an axial sectional view of the rotor of Figure 5 with the scanning disk of Figure 6 mounted thereon.

The operation of a typical rotor may be seen by the exploded sections of Figure 4 which are taken along the stations indicated upon the single phase rotor 26a of Figure 5. Section a of Figure 4 taken along the line a—a of Figure 5 represents the radial mid-line of zero refraction of the spiral path 54 as traced by the scanning disk 25 of Figure 7 upon the rotor face 16 which is adjacent the moving film. An axial ray of light A will strike the surface of the rotor perpendicularly along this line and pass through without deviation. This section also represents the one position along the refractive paths at which the spiral path and the annular path have their respective upper and lower edges each parallel to the ray of light.

Sections $b$ and $b_2$ represent rotor sections of equal and opposite inclination to the beam of light taken through the parallel rotor faces 16 and 17, said sections occurring at 90° rotation of the rotor in either direction from the line a—a. The route of refraction followed by a ray of light impinging on these surfaces is shown by the lines B and $B_2$ respectively, it being evident that the light is bent up or down, as the case may be, so as to emerge in each instance perpendicular to the film 24 and in the same relative position to the stationary projected picture as it bore to the moving frame of film.

The adjacent ends of the refractive path, considered as an infinitesimal circumferential distance apart on a single phase rotor, are shown as sections $c$ and $c_2$ with the corresponding refraction of impinging rays of light shown by lines C and $C_2$, said sections representing the greatest inclination of the parallel faces from the normal, corresponding to the two extreme positions of the moving frame from which projection is effected.

Figure 6:
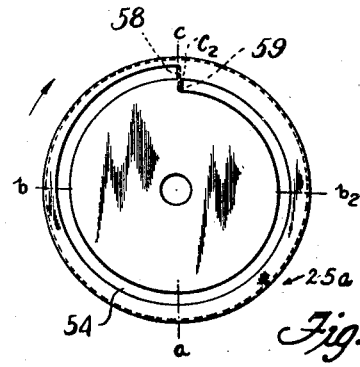
Figure 6 is an end elevational view of a single phase scanning disk adapted to be used at the side of a rotor which is disposed adjacent a moving film.

Accordingly, it will be apparent that as the film moves radially toward the axis of the revolving rotor adjacent the obverse face of the rotor of Figure 5, and as this face is exposed by the superimposed scanning disk of Figure 6, each lateral line of a frame will be refracted progressively along the path outlined by the succession of lines C, B, A, $B_2$, $C_2$, so that during one complete revolution of the rotor each moving frame of film will be projected stationary upon the opposite screen 30, following which, at the shift from $c$ to $c_2$, the image projected by one frame will be instantly superseded on the screen by that of the next successive frame.

It will be seen also that the radial width of the aperture 54 of the scanning disk 25a should correspond to the height of a frame of film, this being likewise the extent of radial displacement of the two ends $c$ and $c_2$ (Figure 6) of the spiral path which the disk traces upon the rotor face 16 which is adjacent the moving film.

Similarly the radial width of the annular aperture 55 of scanning disk 25b disposed adjacent the opposite rotor face 17 also corresponds to the height of a frame of film. Thus if the vertical distance C—A in Figure 4 is taken as the height of a frame which has just been projected on the screen, this frame would move radially adjacent rotor face 16 a distance equal to its height, or from the position C—A to the position A—$C_2$, and during this movement the image projected from the opposite face 17 of the rotor would continuously occupy a position on the screen corresponding to that between the lines B and $B_2$, that is, the space of a frame intermediate between the two extreme positions C—A and A—$C_2$.

It will be appreciated, of course, that the thickness and inclination of the rotor will vary with its refractive properties and the frame-size of the film, and accordingly variation for different size film and diverse refractive media are within the ability of those skilled in the art. Thus, for a 16 mm. projector, I use a prism of $1\frac{3}{8}$ inch thickness between the opposite faces 16 and 17 when employing cast polymerized alpha methyl methacrylate ("Lucite") having a refractive index of 1.50. Other transparent materials having the required physical properties, such as other plastics including glass, may likewise be used. In order to accommodate a shift of this film with a combined positive and negative inclination of the refractive path such as shown in Figure 4, I employ a maximum inclination of $22\frac{1}{2}°$ to the plane of the film. That is, the inclination between sections $c$ and $a$ is $22\frac{1}{2}°$ in one direction and that between sections $a$ and $c_2$ is $22\frac{1}{2}°$ in the opposite direction. If on the other hand, it were desired to achieve the same shift of the frame with the same thickness lens having only a positive and not a negative inclination, that is to produce the total change of one phase of cycle in the shift between section $c$ and section $a$ alone, the maximum inclination of section $c$ would then be twice as great, or $45°$.

Figure 9:
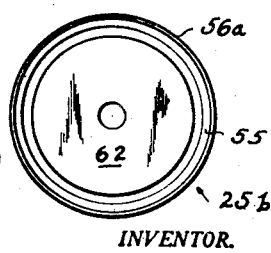
Figure 9 is an elevational view of a scanning disk adapted to be used at the side of a rotor which is opposite its film-adjacent face.

Mounting of scanning disk 25a is facilitated by provision of an axially extending peripheral flange 56 (Figure 7) thereon which fits over the outer edge 19 of the rotor and is secured thereto in any suitable manner, as by being press fit. A precise alignment of the scanning aperture 54 with the corresponding refractive path on the adjacent rotor face 16 is obtained by reason of a pair of thin, radially disposed and generally linearly aligned ears 58 and 59 disposed on the inner face of the disk and adapted to engage the opposite terminal abutments 60 and 61 of the inclined face 16, thereby retaining the aperture 54 in alignment with the adjacent spiral path of the rotor. The disk may also be secured to the rotor hub 48a as by cementing. Mounting of the two-piece scanning disk 25b of Figure 9 on the reverse face 17 of a rotor is similarly effected by a peripheral flange 56a, the separate center portion 62 being secured to the rotor hub by a suitable bonding agent.

Figure 8:
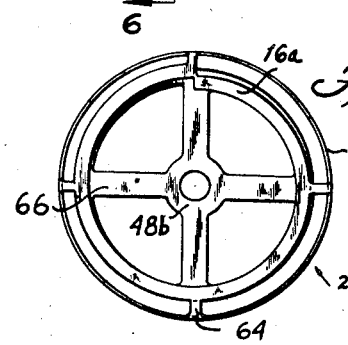
Figure 8 is an end elevational view of a modified form of a single phase rotor.

A modified form of single phase rotor 26b is shown in Figure 8, wherein substantially all of the annular section between the parallel faces 16 and 17 except that joining the spiral path 16a with the opposite annular path of face 17 has been removed, the refractive path thus remaining being linked to a peripheral band 63 by short radial walls 64 and to a central hub 48b by longer radial spokes 66.

By another variation, in addition to or in lieu of a separate scanning disk, all of one or both of rotor faces 16 and 17 with the exception of their respective refractive paths may be provided with an opaque surface and, if desired, the same surface may be extended around the inner and outer faces 18 and 19 of the rotor.

Figure 10:
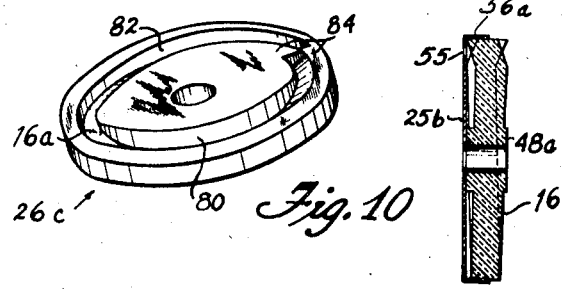
Figure 10 is a perspective view of another modified form of single phase rotor.
Figure 11:
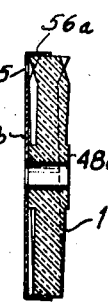
Figure 11 is an axial sectional view of the rotor of Figure 5 with the scanning disk of Figure 9 mounted thereon.

One such opaque rotor 26c is seen in Figure 10 having parallel axially directed walls 80 and 82 extending outward on either side of the spiral path of rotor face 16 and terminating at an opaque radial surface 84, these radial-ended sections being formed on rotor face 16 of opaque plastice such as hard rubber, phenolic resins ("Bakelite"), colored methacrylate, etc. A particular advantage resulting from the use of such a rotor is that the film may be moved substantially flush with the rotating radial surface 84, thereby more rigidly limiting the passage of light to that which moves axially through the refractive path 16a and its aligned frame of film.

Figure 2:
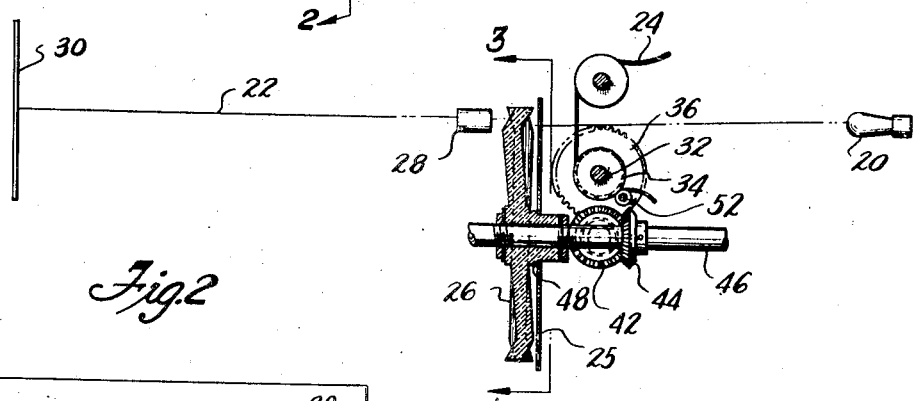
Figure 2 is a longitudinal section through the device taken along the line 2—2 of Fig. 1.
Figure 3:
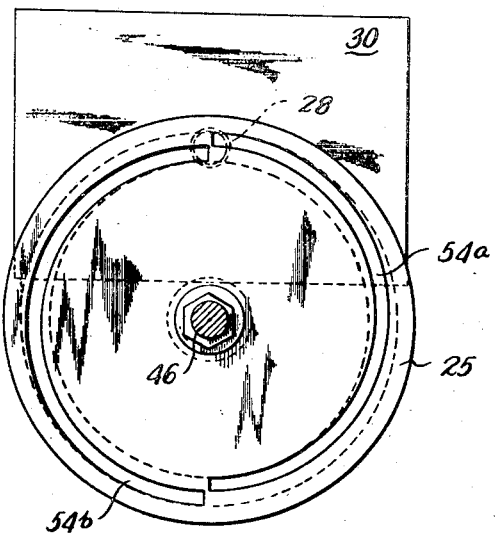
Figure 3 is a front elevation of the double phase scanning disk of the device as seen along the line 3—3 of Figure 2.

In the preferred embodiment illustrated in Figures 1 to 3, the rotor is provided with two complete phases or cycles of refraction so that it is revolved only once for two consecutive frames of film, the scanning disk 25 likewise being provided with two corresponding spiral scanning apertures 54a and 54b. Accordingly, if the pulldown sprocket 34 were adapted to display eight frames per revolution, the rotor would revolve four times for each revolution of the sprocket 34 and consequently the spur gears 36 and 38 would bear a tooth ratio of 4 to 1. At a speed of 24 frames per second, such a two phase rotor would turn at 720 revolutions per minute. Using a rotor of which the outside diameter of the spiral path is 6 inches, the width of a frame of 16 mm. film ($\frac{3}{8}$ inch) would be $\frac{1}{25}$ the circumference of the refractive path, and the two phase rotor would accordingly move this frame width in $\frac{1}{25}$ of $\frac{1}{24}$ of a second. This would be the time required to move a new frame into projection alignment and may be compared with the customary shift period of ⅓ of 1/24 of a second obtained in conventional shutter-type projectors (during which time the screen remains dark). With a larger rotor, this shift time would be accordingly decreased, while on the other hand increasing the number of phases on cycles on the same size rotor face would correspondingly slow down the rate of rotation thus increasing the time of shift from one frame to another. In either event, the length of the spiral path would pass the projection aperture in 1/24 of a second.

While I have shown and described in some detail what presently appear to be preferred embodiments of my moving picture device and lens system, it is to be understood that various modifications may be made in the construction and operation thereof within the scope of the appended claims which are to be interpreted broadly and limited only by the prior art.

The invention claimed is:

1. A lens comprising a refractive body of transparent material of uniform thickness having two parallel faces adapted to be interposed in a beam of light, on each of which may be traced a path of predetermined height and length, one of said paths having a displacement along its length equal to its height, said displacement being transverse to said beam of light, said parallel paths having a progressive inclination with respect to the axis of said beam of light so that movement of the beam lengthwise along the displaced path of said one face will effect a projection of said beam without such displacement from the path of said opposite face.

2. The lens of claim 1 which has means on one of its parallel sides for blocking light on either side of the path of said side.

3. The lens of claim 1 which has means for blocking light on either side of said displaced path.

4. The lens of claim 1 wherein said parallel faces are curved.

5. The lens of claim 1 wherein one end of each of said paths is substantially perpendicular to said beam of light.

6. The lens of claim 1 wherein the two ends of each path are of equal and opposite inclination.

7. A generally annular lens of uniform thickness adapted for rotation and having two transparent parallel faces extending longitudinally in the direction of rotation and adapted to be interposed in a beam of light, on one of which faces may be traced at least one spiral path of predetermined height and length and having a displacement along its length equal to its height, and upon the opposite face of which may be traced a like number of annular paths of like height and length, the corresponding edges of each pair of paths being parallel to said beam of light only at one point along their length, said parallel paths having a progressive inclination with respect to said beam of light so that movement of the beam along the path of said one face will effect a projection of said beam from the path of said opposite face.

8. The lens of claim 7 wherein said paths are disposed respectively about the inner and outer faces of a generally annular rotor.

9. The lens of claim 7 wherein said paths are disposed about axially spaced faces of a generally annular rotor.

10. The lens of claim 7 wherein said rotor is opaque on either side of each path of at least of said faces.

11. The lens of claim 7 wherein the number of paths on each parallel face is one.

12. The lens of claim 7 wherein the number of paths on each parallel face is more than one.

13. The lens of claim 7 which additionally contains an opaque surface disposed adjacent one of said faces substantially perpendicular to said beam of light, said surface containing an aligned aperture corresponding in height and length to each path of the adjacent face of the lens.

14. A generally annular lens of uniform thickness adapted for rotation and for the transmission and refraction of a beam of light moving axially thereto between a stationary object and a radially moving film aligned on opposite sides of said lens, said lens having a pair of axially spaced, parallel faces so shaped that there may be traced on the face adjacent said moving film during one revolution of said lens, one or more consecutive spiral paths of uniform height corresponding to the radial travel of said film during the passage of each path transverse thereto and on the opposite parallel face there may be traced an annular path of like height and length, each of said paths consisting of two portions of progressively increasing and oppositely directed inclination extending equidistant on either side of a radial plane taken on said faces substantially perpendicular to said beam of light, the corresponding edges of each pair of paths being parallel to said beam of light only at said radial plane and the spiral one of each of said pair of paths having a radial displacement along its length equal to its height.

15. The lens of claim 14 which additionally contains an opaque plate disposed adjacent one of said faces, said plate being mounted substantially radially to said axis of rotation and containing an aligned aperture corresponding in height and length to each path of the adjacent face of the lens.

16. A film operating device including: means for continuously moving a film; a generally annular lens of uniform thickness rotatably disposed in a beam of light between said film and an aligned object, said lens having a pair of axially spaced parallel faces so shaped that there may be traced during one revolution on the face adjacent said film, at least one consecutive spiral path of uniform height corresponding to the height of a frame of said film, and on the opposite parallel face, a like number of annular paths of like height and length, the corresponding edges of each pair of parallel paths being parallel to said beam of light only at one point along their length, said parallel paths having a progressive inclination with respect to said beam of light so that movement of the beam along the path of said one face will effect a projection of said beam from the path of said opposite face; and means for revolving said lens synchronously with the movement of said film radially thereto.

17. A film operating device including: means for continuously moving a film; a generally annular lens of uniform thickness rotatably disposed in a beam of light between said film and an aligned object, said lens having a pair of axially spaced parallel faces so shaped that there may be traced during one revolution on the face adjacent said film at least one consecutive spiral path of uniform height corresponding to the height of a frame of said film, and on the opposite face, a like number of annular paths of like height and length, the corresponding edges of each pair of parallel paths being parallel to said beam of light only at one point along their length, said parallel paths having a progressive inclination with respect to said beam of light so that movement of the beam along the path of said one face will effect a projection of said beam from the path of said opposite face; means for restricting the passage of light through the lens face nearest said film, to the area of each adjacent spiral path; and means for revolving said lens synchronously with the movement of said film radially thereto.

18. A film operating device including: means for continuously moving a film; a generally annular lens of uniform thickness rotatably disposed in a beam of light between said film and an aligned object, said lens having a pair of axially spaced parallel faces so shaped that there may be traced during one revolution on said face adjacent said film, at least one consecutive spiral path of uniform height corresponding to the height of a frame of said film, and on said opposite face a like number of annular paths of like height and length, each of said pair of parallel paths consisting of two portions of progressively increasing and oppositely directed inclination extending equidistant on either side of a radial plane taken on said faces substantially perpendicular to said beam of light, each of said spiral paths having a radial displacement along its length equal to its height, the corresponding edges of each pair of axially spaced paths being parallel at said radial plane to said beam of light so that movement of the beam along the path of said one face will effect a projection of said beam from the path of said opposite face; and means for revolving said lens synchronously with the movement of said film radially thereto.

19. A film operating device including: means for continuously moving a film; a generally annular lens of uniform thickness rotatably disposed in a beam of light between said film and an aligned object, said lens having a pair of axially spaced parallel faces so shaped that there may be traced during one revolution on said face adjacent said film, at least one consecutive spiral path of uniform height corresponding to the height of a frame of said film, and on said opposite face a like number of annular paths of like height and length, each of said pair of parallel paths consisting of two portions of progressively increasing and oppositely directed inclination extending equidistant on either side of a radial plane taken on said faces substantially perpendicular to said beam of light, each of said spiral paths having a radial displacement along its length equal to its height; the corresponding edges of each pair of axially spaced paths being parallel at said radial plane to said beam of light so that movement of the beam along the path of said one face will effect a projection of said beam from the path of said opposite face; means for restricting the passage of light through the lens face nearest said film to the area of each adjacent spiral path; and means for revolving said lens synchronously with the movement of said film radially thereto.

CLARENCE L. TOMLINSON.

REFERENCES CITED

The following references are of record in the file of this patent:

UNITED STATES PATENTS

| Number | Name | Date |
|---|---|---|
| 1,219,403 | Selby et al. | Mar. 13, 1917 |
| 1,385,325 | Jenkins | July 19, 1921 |
| 1,544,155 | Jenkins | June 30, 1925 |
| 1,935,219 | Wildhaber | Nov. 14, 1933 |

FOREIGN PATENTS

| Number | Country | Date |
|---|---|---|
| 389,537 | Germany | Feb. 4, 1924 |
| 51,335 | Switzerland | Mar. 29, 1924 |